United States Patent
Maekawa et al.

(10) Patent No.: US 12,153,124 B2
(45) Date of Patent: Nov. 26, 2024

(54) RADAR APPARATUS, VEHICLE, AND METHOD OF REMOVING UNNECESSARY POINT

(71) Applicant: Murata Manufacturing Co., Ltd., Nagaokakyo (JP)

(72) Inventors: Takuya Maekawa, Nagaokakyo (JP); Nobuya Arakawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 427 days.

(21) Appl. No.: 17/520,757

(22) Filed: Nov. 8, 2021

(65) Prior Publication Data

US 2022/0057504 A1    Feb. 24, 2022

Related U.S. Application Data

(63) Continuation of application No. PCT/JP2020/020757, filed on May 26, 2020.

(30) Foreign Application Priority Data

Jun. 10, 2019 (JP) .................................. 2019-107873

(51) Int. Cl.
    *G01S 13/88* (2006.01)
    *G01S 13/32* (2006.01)

(52) U.S. Cl.
    CPC .............. *G01S 13/88* (2013.01); *G01S 13/32* (2013.01)

(58) Field of Classification Search
    CPC .................................. G01S 13/88; G01S 13/32
    See application file for complete search history.

(56) References Cited

U.S. PATENT DOCUMENTS

2017/0168139 A1   6/2017 Lim et al.
2017/0363736 A1* 12/2017 Kaino ................... G01S 13/931
(Continued)

FOREIGN PATENT DOCUMENTS

JP          8-82671 A      3/1996
JP       2012-185029 A      9/2012
(Continued)

OTHER PUBLICATIONS

International Search Report and Written Opinion mailed on Aug. 11, 2020, received for PCT Application PCT/JP2020/020757, Filed on May 26, 2020, 8 pages including English Translation.

*Primary Examiner* — Peter M Bythrow
*Assistant Examiner* — Nazra Nur Waheed
(74) *Attorney, Agent, or Firm* — XSENSUS LLP

(57) ABSTRACT

A radar apparatus is constituted by a transmitter including transmit antennas, and a receiver including receive antennas, and processing circuitry. When a first beam pattern is used for detection, a memory of the receiver stores as a first result a detection result indicating the position of a reflection point of radio wave. When a second beam pattern is used for detection, a memory of the receiver stores as a second result a detection result indicating the position of a reflection point of radio wave. A detection-result comparator of the receiver compares the first and second results. When the position of a reflection point of the first result is different from the position of the reflection point of the second result, the detection-result comparator removes the reflection point that differs in position.

16 Claims, 7 Drawing Sheets

(56) References Cited

U.S. PATENT DOCUMENTS

2019/0377075 A1* 12/2019 Tsfati .................... H04B 17/27
2019/0379429 A1* 12/2019 Chang ................... H04B 7/043

FOREIGN PATENT DOCUMENTS

| JP | 2015-117961 A | 6/2015 |
| JP | 2017-227510 A | 12/2017 |
| JP | 2019-70565 A | 5/2019 |

* cited by examiner

RADAR APPARATUS, VEHICLE, AND METHOD OF REMOVING UNNECESSARY POINT

CROSS-REFERENCE TO RELATED APPLICATIONS

The present application is a continuation of and claims priority to PCT/JP2020/020757, filed May 26, 2020, which claims priority to JP 2019-107873, filed Jun. 10, 2019, the entire contents of each are incorporated herein by its reference.

TECHNICAL FIELD

The present disclosure relates to a radar apparatus for locating an object, a vehicle, and a method of removing an unnecessary point.

BACKGROUND ART

Patent Document 1 discloses a radar apparatus configured to determine whether a virtual-image area contains in the same direction a plurality of images that are considered to be a target physical object (object that is targeted). The radar apparatus disclosed in Patent Document 1 causes an image at a shortest distance of the plurality of images to be displayed as a real image, determines the other images as virtual images created by multiple reflection, and remove the other images from display by means of signal processing.

CITATION LIST

Patent Document

Patent Document 1: Japanese Unexamined Patent Application Publication No. 8-82671

SUMMARY

However, the reflected wave detected at a shortest distance does not always come from an actual target physical object. In this case, a problem arises for the radar apparatus disclosed in Patent Document 1 in which it is difficult to distinguish between a real image of an actual target physical object and virtual images created by something other than the target physical object.

An object of an embodiment of the present disclosure is to provide a radar apparatus capable of accurately distinguish between a real image and a virtual image, a vehicle, and a method of removing an unnecessary point.

According to an embodiment of the present disclosure, a radar apparatus has a transmitter including a transmit antenna, and a receiver including a receive antenna, and processing circuitry. At least either the transmit antenna or the receive antenna is one of a plurality of transmit antennas or one of a plurality of receive antennas. The transmitter or the receiver is capable of using a first beam pattern and a second beam pattern different from the first beam pattern. The receiver includes a memory and a detection-result comparator. The memory is configured to, when the first beam pattern is used for detection, store as a first result a detection result indicating a position of a reflection point of radio wave and, when the second beam pattern is used for detection, store as a second result a detection result indicating a position of the reflection point of radio wave. The detection-result comparator is configured to compare the first result and the second result and, when the position of the reflection point of the first result is different from the position of the reflection point of the second result, remove the reflection point that differs in position.

According to an embodiment of the present disclosure, a method of removing an unnecessary point is for use by a radar apparatus having a transmitter including a transmit antenna, and a receiver including a receive antenna, and processing circuitry. At least either the transmit antenna or the receive antenna is one of a plurality of transmit antennas or one of a plurality of receive antennas. The transmitter or the receiver is capable of using a first beam pattern and a second beam pattern different from the first beam pattern. The method includes, by the receiver, when the first beam pattern is used for detection, storing as a first result a detection result indicating a position of a reflection point of radio wave, when the second beam pattern is used for detection, storing as a second result a detection result indicating a position of the reflection point of radio wave, and comparing the first result and the second result and, when the position of the reflection point of the first result is different from the position of the reflection point of the second result, removing the reflection point that differs in position.

An embodiment of the present disclosure can accurately distinguish between a real image and a virtual image.

DESCRIPTION OF EMBODIMENTS

Hereinafter, a radar apparatus and a method of removing an unnecessary point according to embodiments of the present disclosure will be described in detail with reference to the accompanying drawings by using as an example the case in which the radar apparatus and the method are used for a vehicle such as an automobile.

Figure 1:
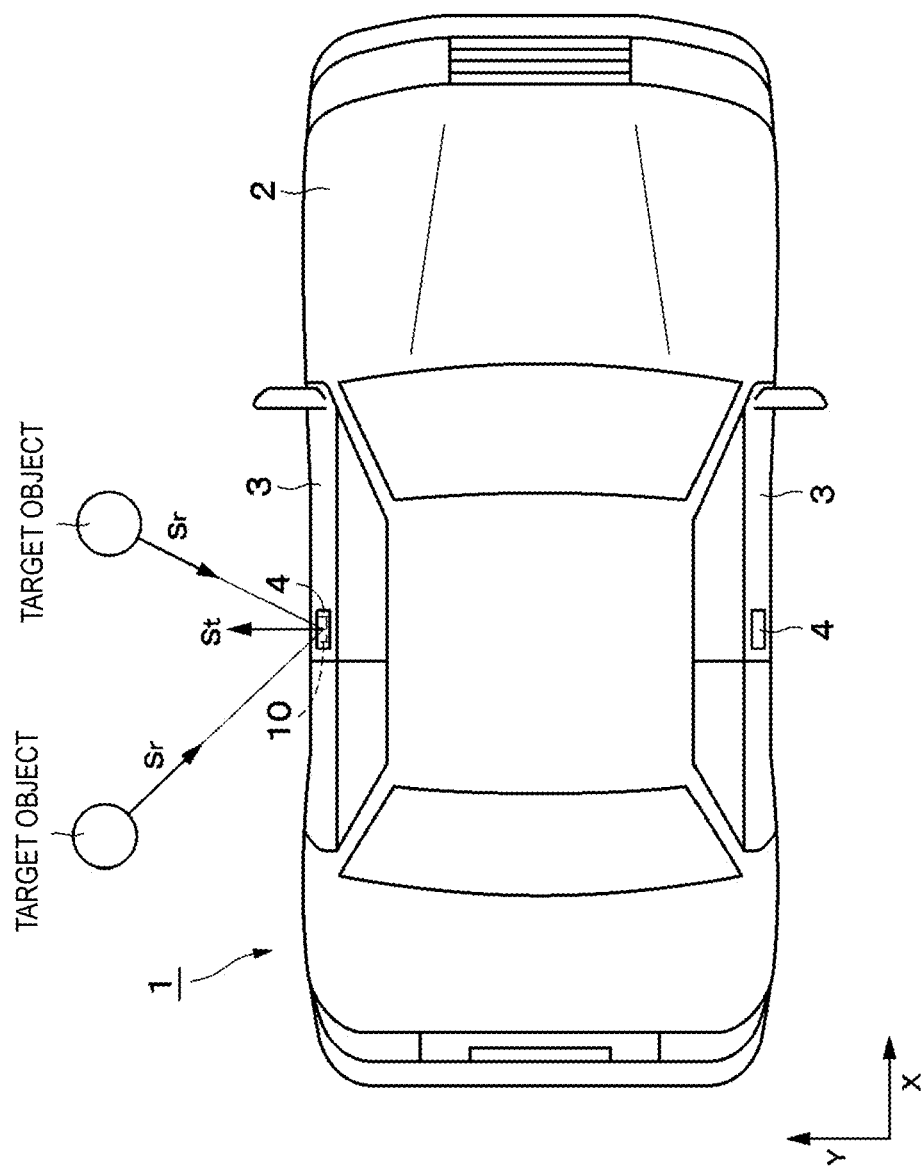
FIG. 1 is a plan view of a vehicle equipped with a radar apparatus according to a first embodiment of the present disclosure.

FIG. 1 illustrates a vehicle 1. The vehicle 1 includes a vehicle body 2, doors 3 attached to the vehicle body 2 and designed to open and close, and doorknobs 4 attached to the doors 3.

The vehicle 1 includes a radar apparatus 10 according to a first embodiment of the present disclosure. The radar apparatus 10 is a radar apparatus that searches for a target object by using, for example, the frequency-modulated continuous-wave (FMCW) technique. The radar apparatus 10 is installed at, for example, the doorknob 4 of the vehicle 1. The radar apparatus 10 emits a radio wave in the Y direction, which is perpendicular to the travel direction (X direction) of the vehicle 1, to search for a target object (target physical object).

FIG. 1 illustrates as an example the radar apparatus 10 attached to the left door 3 of the vehicle 1. The present disclosure is not limited to this example; the radar apparatus 10 may be attached to the right door 3 or a plurality of parts of the vehicle 1.

Figure 2:
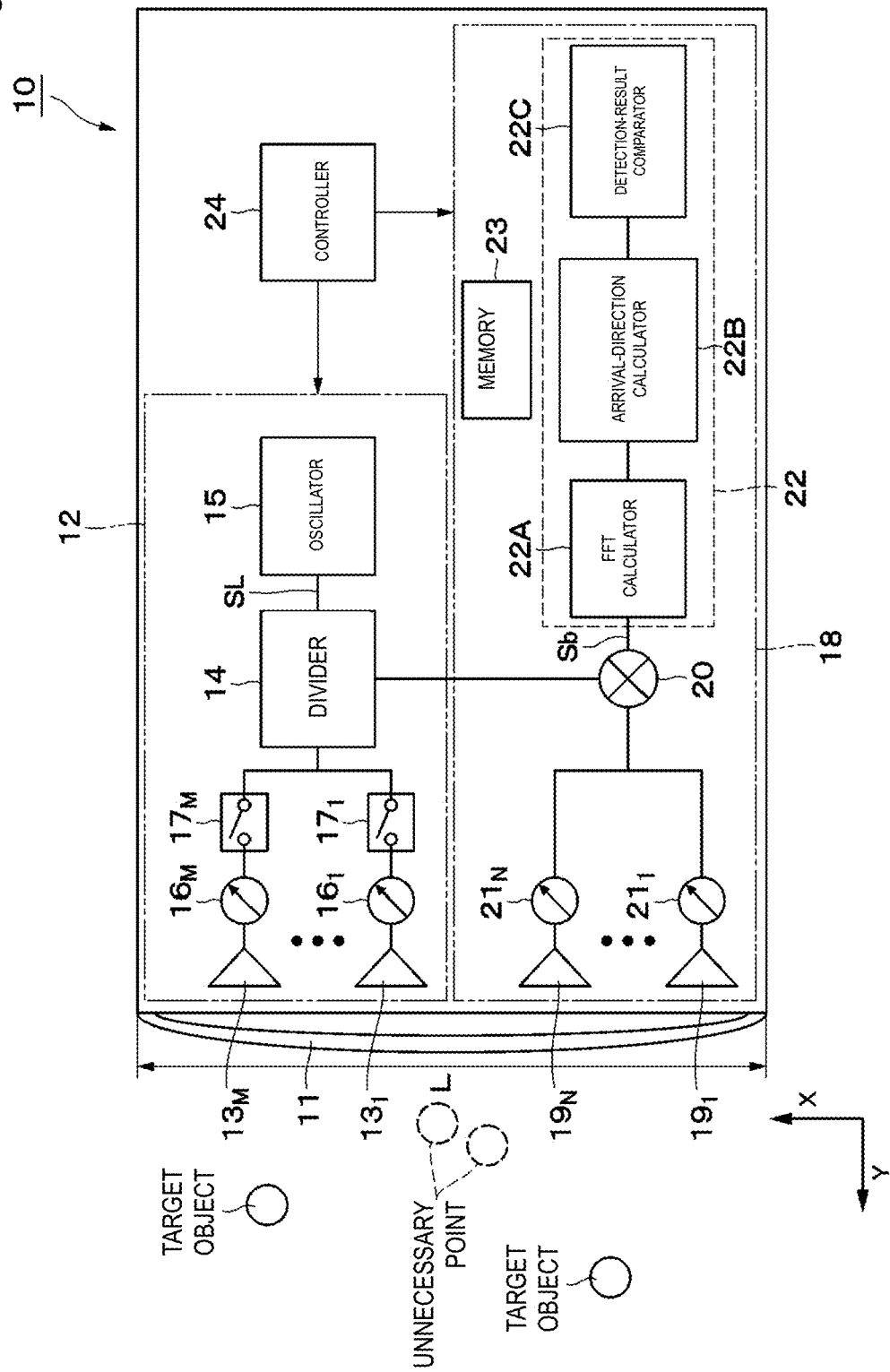
FIG. 2 is a block diagram illustrating the radar apparatus in FIG. 1.

As illustrated in FIG. 2, the radar apparatus 10 includes a transmitter 12 and a receiver 18. A radome 11 covers transmit antennas $13_1$ to $13_M$ of the transmitter 12 and receive antennas $19_1$ to $19_N$ of the receiver 18. The radome 11 is made of a dielectric material (non-conductive material) transparent to radio waves. The external length of the radome 11 is, for example, L.

The transmitter 12 transmits, for example, a frequency-modulated transmit signal St (refer to FIG. 1). As illustrated in FIG. 2, the transmitter 12 includes multiple elements (for example, M elements, where M is a natural number) of the transmit antennas $13_1$ to $13_M$, a divider 14, and an oscillator 15. Phase shifters $16_1$ to $16_M$ and switches $17_1$ to $17_M$ are coupled to the transmit antennas $13_1$ to $13_M$. The transmit antennas $13_1$ to $13_M$ are implemented by, for example, non-directional antennas. The transmit antennas $13_1$ to $13_M$ are aligned at, for example, regular intervals in the X direction.

The oscillator 15 oscillates a local signal SL. Specifically, the oscillator 15 outputs the local signal SL constituted by a chirp signal in which the frequency linearly increases with time. The divider 14 divides the local signal SL into two. The divider 14 supplies the local signal SL to the transmit antennas $13_1$ to $13_M$ and also to a mixer 20. As such, the local signal SL is supplied through the divider 14, the switches $17_1$ to $17_M$, and the phase shifters $16_1$ to $16_M$ to the transmit antennas $13_1$ to $13_M$. The local signal SL is also supplied to the mixer 20 of the receiver 18 through the divider 14.

Figure 4:
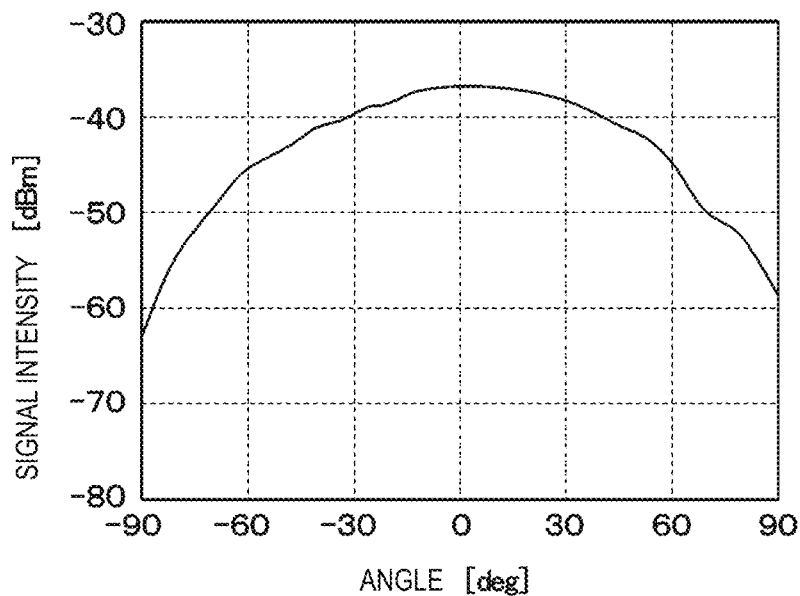
FIG. 4 is a characteristic diagram illustrating a plot of angle versus signal intensity in the case of operating a multiple-input multiple-output (MIMO) radar.
Figure 5:
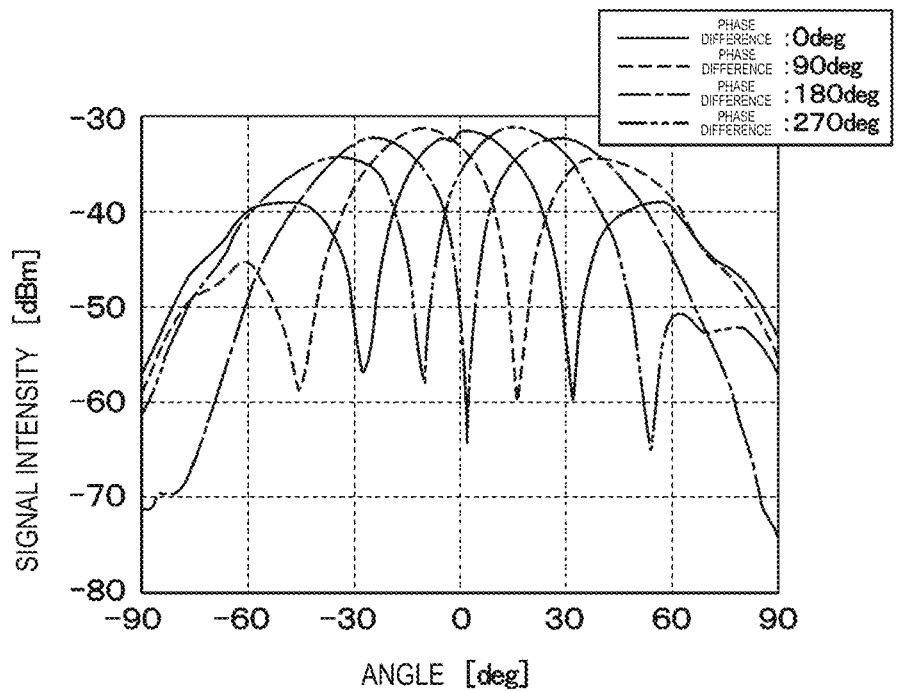
FIG. 5 is a characteristic diagram illustrating plots of angle versus signal intensity in the case of analog beamforming.

The phase shifters $16_1$ to $16_M$ control, on the basis of a control signal from the controller 24, the phase of the local signal SL supplied to the transmit antennas $13_1$ to $13_M$. As illustrated in FIG. 4, when one of the transmit antennas $13_1$ to $13_M$ is selected to emit a radio wave, the radio wave is emitted over a wide-angle range. By contrast, as illustrated in FIG. 5, when the phase difference between two adjacent transmit antennas $13_i$ and $13_{i+1}$ vary, beam patterns also differ. Hence, the phase shifters $16_1$ to $16_M$ and the switches $17_1$ to $17_M$ control the beam pattern (directivity) of the radio wave (transmit signal St) emitted by the transmit antennas $13_1$ to $13_M$. Power amplifiers (not illustrated in the drawing) are coupled between the phase shifters $16_1$ to $16_M$ and the transmit antennas $13_1$ to $13_M$.

The switches $17_1$ to $17_M$ are disposed between the divider 14 and the phase shifters $16_1$ to $16_M$. The switches $17_1$ to $17_M$ turn on or off in response to control signals from the controller 24, so that the switches $17_1$ to $17_M$ select from the transmit antennas $13_1$ to $13_M$ one or more transmit antennas to emit radio waves.

The receiver 18 receives a reflected wave of the transmit signal St reflected by a target object (target physical object) as a receive signal Sr (refer to FIG. 1). The receiver 18 then generates a beat signal Sb that is a differential signal between the transmit signal St and the receive signal Sr. As illustrated in FIG. 2, the receiver 18 includes multiple pieces (for example, N pieces, where N is a natural number) of the receive antennas $19_1$ to $19_N$, the mixer 20, and processing circuitry 22. The receive antennas $19_1$ to $19_N$ are implemented by, for example, non-directional antennas. The receive antennas $19_1$ to $19_N$ are aligned at, for example, regular intervals in the X direction. The receive antennas $19_1$ to $19_N$ may be identical in number to or different in number from the transmit antennas $13_1$ to $13_M$. When a target object reflects the transmit signal St, the receive antennas $19_1$ to $19_N$ receive the receive signal Sr that is a reflected wave (echo signal) reflected by the target object and returned back.

Phase shifters $21_1$ to $21_N$ are coupled to the receive antennas $19_1$ to $19_N$. Low-noise amplifiers (not illustrated in the drawing) are coupled between the receive antennas $19_1$ to $19_N$ and the phase shifters $21_1$ to $21_N$.

The phase shifters $21_1$ to $21_N$ control, on the basis of a control signal from the controller 24, the phase of the receive signal Sr received by the receive antennas $19_1$ to $19_N$. As such, the phase shifters $21_1$ to $21_N$ control the beam pattern (directivity) of the radio wave received by the receive antennas $19_1$ to $19_N$.

The mixer 20 outputs the beat signal Sb based on the receive signal Sr, which is formed by the transmit signal St reflected by a target object and received by the receive antennas $19_1$ to $19_N$, and the local signal SL. Specifically, the mixer 20 generates the beat signal Sb by multiplying the receive signal Sr received by the receive antennas $19_1$ to $19_N$ by the local signal SL identical to the transmit signal St outputted by the transmit antennas $13_1$ to $13_M$. The mixer 20 is coupled to the processing circuitry 22 via an ADC (not illustrated in the drawing). The ADC (analog-to-digital converter) converts an analog signal of the beat signal Sb to a digital signal.

The processing circuitry 22 is implemented by, for example, a microcomputer. A memory 23 is coupled to the processing circuitry 22. The memory 23 is a rewritable memory such as a random-access memory (RAM).

The processing circuitry 22 is configured by software and/or hardware to function as a fast-Fourier-transform (FFT) calculator 22A, an arrival-direction calculator 22B, and a detection-result comparator 22C. The FFT calculator 22A performs the fast Fourier transform (FFT) to convert the beat signal Sb into a frequency signal. At this time, the frequency of the beat signal Sb is proportional to the time taken by the transmit signal St to be reflected by a target physical object and returned back. Thus, the FFT calculator 22A measures the distance to a target object in accordance with a frequency signal.

The arrival-direction calculator 22B detects an azimuth angle (direction) of a target object by detecting the phase of the receive signal Sr received by, for example, two adjacent receive antennas $19_i$ and $19_{i+1}$. The processing circuitry 22 locates a plurality of target objects by obtaining the distance and azimuth angle of each target object in the manner described above. The processing circuitry 22 stores the position of the detected target object in the memory 23.

When a first beam pattern is used for detection, the receiver 18 stores as a first result a detection result indicating the position of a reflection point of radio wave. Specifically, when the transmitter 12 emits a radio wave of the first beam pattern, the receiver 18 stores a detection result indicating the position of a reflection point of radio wave as the first result in the memory 23. The first beam pattern is a beam pattern appearing when, for example, any one of the transmit antennas $13_1$ to $13_M$ emits a non-directional radio wave (refer to FIG. 4).

When a second beam pattern is used for detection, the receiver 18 stores as a second result a detection result indicating the position of a reflection point of radio wave. Specifically, when the transmitter 12 emits radio waves of the second beam pattern, the receiver 18 stores a detection result indicating the position of a reflection point of radio wave as the second result in the memory 23. The second beam pattern is a beam pattern having a particular form of directivity when, for example, the transmit antennas $13_1$ to $13_M$ together emit radio waves of controlled phases (refer to FIG. 5).

The first and second beam patterns are not necessarily transmit beam patterns and may be receive beam patterns. This means that the beam pattern is not necessarily controlled by the phase shifters $16_1$ to $16_M$ and the switches $17_1$ to $17_M$ of the transmitter 12 and may be controlled by the phase shifters $21_1$ to $21_N$ of the receiver 18.

The detection-result comparator 22C compares the first and second results. When the position of a reflection point of the first result is different from the position of the reflection point of the second result, the detection-result comparator 22C removes the reflection point that differs in position (unnecessary point).

Figure 3:
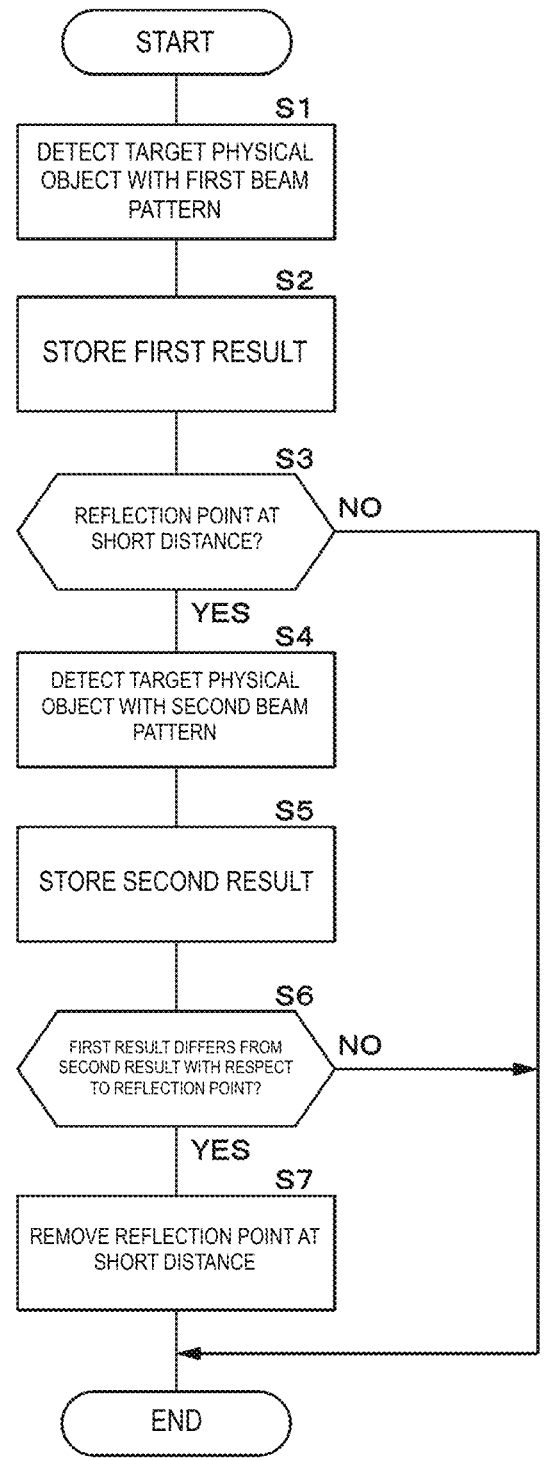
FIG. 3 is a flowchart illustrating an unnecessary-point removal process.

The controller 24 implements a program of an unnecessary-point removal process illustrated in FIG. 3. Specifically, the controller 24 controls the transmitter 12 to emit a radio wave of the first beam pattern. At this time, the controller 24 controls the receiver 18 to store in the memory 23 the first result obtained with the first beam pattern. The controller 24 also controls the transmitter 12 to emit radio waves of the second beam pattern. At this time, the controller 24 controls the receiver 18 to store in the memory 23 the second result obtained with the second beam pattern. After the first and second results are stored, the controller 24 compares the first and second results by using the detection-result comparator 22C and removes unnecessary points.

Next, the unnecessary-point removal process implemented by the controller 24 will be described with reference to FIG. 3.

In step S1 in FIG. 3, the controller 24 causes the radar apparatus 10 to operate as a multiple-input multiple-output (MIMO) radar and detect a target physical object. Specifically, the controller 24 controls the switches $17_1$ to $17_M$ of the transmitter 12 to cause one transmit antenna of the transmit antennas $13_1$ to $13_M$ to emit the transmit signal St. At this time, the transmitter 12 emits a non-directional radio wave as the first beam pattern. In this state, the receiver 18 detects the position of the target object in accordance with the receive signal Sr received by the receive antennas $19_1$ to $19_N$. This operation of position detection is repeated by successively changing the one transmit antenna selected from the transmit antennas $13_1$ to $13_M$.

In step S2, the receiver 18 stores the finally obtained position of the target object as the first result in the memory 23. At this time, the first result includes the positions of reflection points of a radio wave detected with the first beam pattern.

In step S3, the controller 24 determines whether the first result includes a target object (reflection point) at a short distance. Specifically, the controller 24 determines whether the distance to a target object is, for example, equal to or shorter than the length L of the radome 11. When the first result does not include a reflection point at a short distance, "NO" is determined in step S3, and the process ends. By contrast, when the first result includes a reflection point at a short distance, "YES" is determined in step S3, and the process moves to step S4.

In step S4, the controller 24 causes the radar apparatus 10 to operate as a radar using analog beamforming and detects a target physical object. Specifically, the controller 24 controls the phase shifters $16_1$ to $16_M$ of the transmitter 12 and causes the transmit antennas $13_1$ to $13_M$ to emit directional radio waves toward the positions of the target objects (reflection points) stored as the first result. At this time, the transmitter 12 emits directional radio waves as the second beam pattern. In this state, the receiver 18 detects the position of the target object in accordance with the receive signal Sr received by the receive antennas $19_1$ to $19_N$.

In step S5, the receiver 18 stores the position of the target object as the second result in the memory 23. At this time, the second result includes the positions of reflection points of radio waves detected with the second beam pattern.

Subsequently in step S6, the detection-result comparator 22C of the receiver 18 compares the first and second results and determines whether the positions of the reflection points included in the first result are different from the positions of the reflection points included in the second result. When the first result is identical to the second result with respect to the positions of reflection points, "NO" is determined in step S6, and the process ends. When the first result is different from the second result with respect to the positions of reflection points, "YES" is determined in step S6, and the process moves to step S7.

In step S7, the reflection point (unnecessary point) that differs in position between the first and second results is removed. When the position of a reflection point of the first result is different from the position of the reflection point of the second result, it is considered that the reflection point is an unnecessary point due to the radome 11. For example, a wave may be reflected multiple times between the radome 11 and the transmit antennas $13_1$ to $13_M$ or the receive antennas $19_1$ to $19_N$. A radio wave may propagate in the radome 11. The receiver 18 may detect an unnecessary reflection point due to a combined wave composed of these waves. However, when the beam pattern varies, how a combined wave is formed also changes. And as a result, a reflection point tends to change in position. For this reason, by removing the reflection point that differs in position between the first and second results, an unnecessary reflection point can be removed.

As described above, in the unnecessary-point removal process, the controller 24 switches between the first beam pattern implemented by MIMO and the second beam pattern implemented by analog beamforming. In the second beam pattern, main beams are directed by analog beamforming toward the reflection points estimated by the MIMO radar. Subsequently, the first result obtained with the first beam pattern and the second result obtained with the second beam pattern are stored and compared.

When a wave is reflected by a target physical object (target) at a reflection point estimated with the first beam pattern, the first and second results are identical to each other with respect to the position of the reflection point. By contrast, when a wave is reflected by the radome 11 at a reflection point estimated with the first beam pattern, the first and second results are different from each other with respect to the position of the reflection point. This is because the propagation mode of the wave reflected by the radome 11 differs between the first and second beam patterns.

Specifically, when different beam patterns are used by the transmit antennas $13_1$ to $13_M$ (or the receive antennas $19_1$ to $19_N$) of the radar apparatus 10, the propagation mode of the wave reflected by the radome 11 in a near filed also varies. Hence, in the case of reflection by a target, when different beam patterns are used for detection, the reflection point appear at the same position. By contrast, in the case of near-field reflection by the radome 11, when different beam patterns are used for detection, the reflection point appear at different positions.

In consideration of such characteristics, it is determined in the unnecessary-point removal process whether a reflection point is an unnecessary point in accordance with a comparison result of the first and second results.

Figure 6:
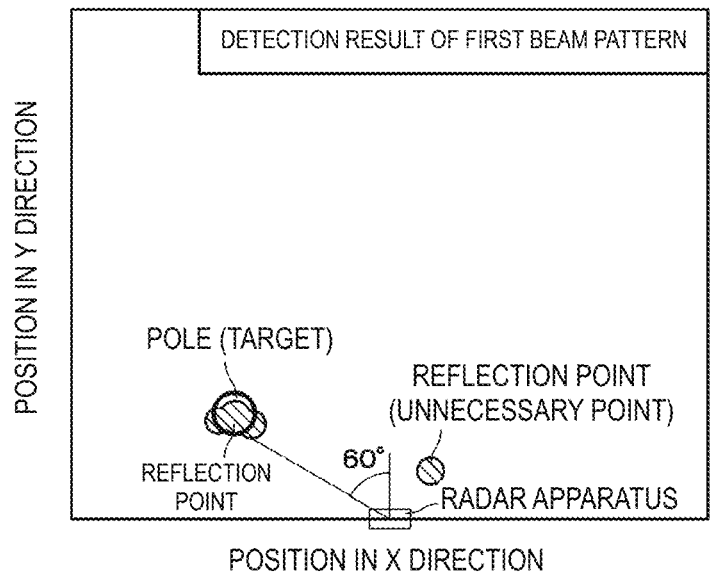
FIG. 6 is an explanatory diagram illustrating an example of detection results when a first beam pattern is used to detect a target object.
Figure 7:
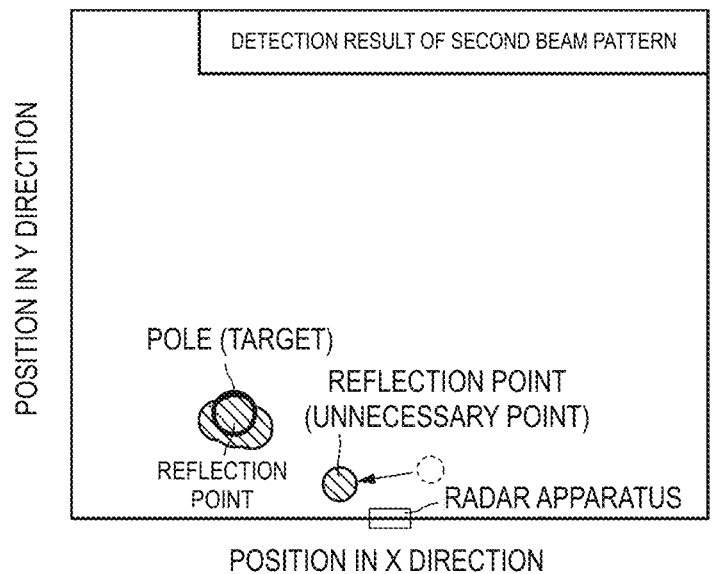
FIG. 7 is an explanatory diagram illustrating an example of detection results when a second beam pattern is used to detect a target object.

To see the effect of unnecessary-point removal according to the present disclosure, the radar apparatus 10 was used to detect a pole positioned at an angle of 60° relative to the radar apparatus 10 by using the first beam pattern implemented by MIMO and the second beam pattern implemented by analog beamforming. The result of this case is illustrated in FIGS. 6 and 7. As illustrated in FIGS. 6 and 7, the position of the reflection point of the pole was the same in both the detection result of the first beam pattern and the detection result of the second beam pattern. By contrast, the position of the reflection point of near-field reflection by the radome 11 differed between the detection result of the first beam pattern and the detection result of the second beam pattern. This is because changing the beam pattern of the transmit antennas $13_1$ to $13_M$ changed the propagation mode of the wave reflected by the radome 11.

Usually, a target such as a pole reflects a single wave. By contrast, an unnecessary point reflects a combined wave composed of a plurality of waves including a wave reflected multiple times between the radome 11 and the transmit antennas $13_1$ to $13_M$ or the receive antennas $19_1$ to $19_N$ and a radio wave propagating in the radome 11. Such a combined wave is detected as a reflection point. However, when the beam pattern varies, the propagation modes of these radio waves also change, and as a result, the detected position of a reflection point differs.

For this reason, the first result obtained with the first beam pattern is compared to the second result obtained with the second beam pattern in the unnecessary-point removal process, so that it is determined whether a reflection point is an unnecessary point. Accordingly, the radar apparatus 10 can remove an unnecessary point (virtual image) appearing due to reflection by the radome 11 and accurately detect a reflection point (real image) of a target.

As described above, in the radar apparatus 10 according to the present embodiment, when the first beam pattern is used for detection, the memory 23 of the receiver 18 stores as the first result a detection result indicating the position of a reflection point of radio wave. When the second beam pattern is used for detection, the memory 23 of the receiver 18 stores as the second result a detection result indicating the position of the reflection point of radio wave. The detection-result comparator 22C of the receiver 18 compares the first and second results. When the position of a reflection point of the first result is different from the position of the reflection point of the second result, the detection-result comparator 22C removes the reflection point that differs in position.

The phase shifters $16_1$ to $16_M$ discretely control the transmit antennas $13_1$ to $13_M$ with regard to the pattern of directivity (beam pattern), and the results by the respective transmit antennas $13_1$ to $13_M$ are respectively subjected to comparison operation. As a result, it is possible to determine that an unnecessary point appearing due to the radome 11 is detected and remove the unnecessary point.

A reflection point of a target is detected in accordance with a wave reflected by the target. At this time, the wave reflected by the target propagates in a single propagation mode. Hence, when the beam pattern is changed, the position of the reflection point does not change.

By contrast, an unnecessary point appearing due to reflection by the radome 11 is detected in accordance with a combined wave formed by combining a wave reflected multiple times between the radome 11 and an antenna and a radio wave propagating in the radome 11. This means that a combined wave composed of waves in a plurality of propagation modes causes an unnecessary point appearing due to reflection by the radome 11. When the beam pattern of an antenna changes, the intensity and phase of the wave reflected multiple times by the radome 11 changes. Because these characteristics of the reflected wave change, the characteristics (intensity and phase) of the combined wave also change. The radar apparatus 10 measures the relative angle of the source of a reflected wave in accordance with phase. Thus, when phase changes, the detection angle also changes. Hence, different beam patterns are compared to each other with respect to the detection position, and as a result, it is possible to distinguish between an unnecessary point based on reflection by the radome 11 and a reflection point based on reflection by a target.

The transmitter 12 performs analog beamforming in which the phase shifters $16_1$ to $16_M$ control the directivity of radio waves. In this manner, after the radar apparatus 10 detects a target physical object with the first beam pattern implemented by MIMO with a non-directional radio wave, the radar apparatus 10 can form the second beam pattern to direct a main beam toward an estimated reflection point. As a result, one reflection point can be detected by using at least two beam patterns. In this manner, it is possible to accurately distinguish between a reflection point appearing due to reflection by a target physical object and an unnecessary point appearing due to reflection by the radome 11.

In the first embodiment, the transmitter 12 includes the phase shifters $16_1$ to $16_M$, and additionally, the receiver 18 includes the phase shifters $21_1$ to $21_N$. The present disclosure is not limited to this configuration. When the transmit side switches between the first and second beam patterns, the phase shifters on the receive side may be removed. In this case, only a single receive antenna may be included.

When the receive side switches between the first and second beam patterns, the phase shifters on the transmit side may be removed. In this case, only a single transmit antenna may be included.

The first embodiment uses the first beam pattern implemented by MIMO and the second beam pattern implemented by analog beamforming. The present disclosure is not limited to this configuration. The first and second beam patterns can be both implemented by analog beamforming. In this case, the first and second beam patterns are different from each other with respect to, for example, the direction of the main beam.

A reflection point (unnecessary point) appearing due to reflection by the radome 11 is usually positioned close to the radar apparatus 10. For this reason, in the unnecessary-point removal process according to the first embodiment, an unnecessary point is selectively determined from reflection points at short distances and removed. The present disclosure is not limited to this configuration. Reflection points at distances (long distances) other than short distances may be used to determine and remove an unnecessary point.

Figure 8:
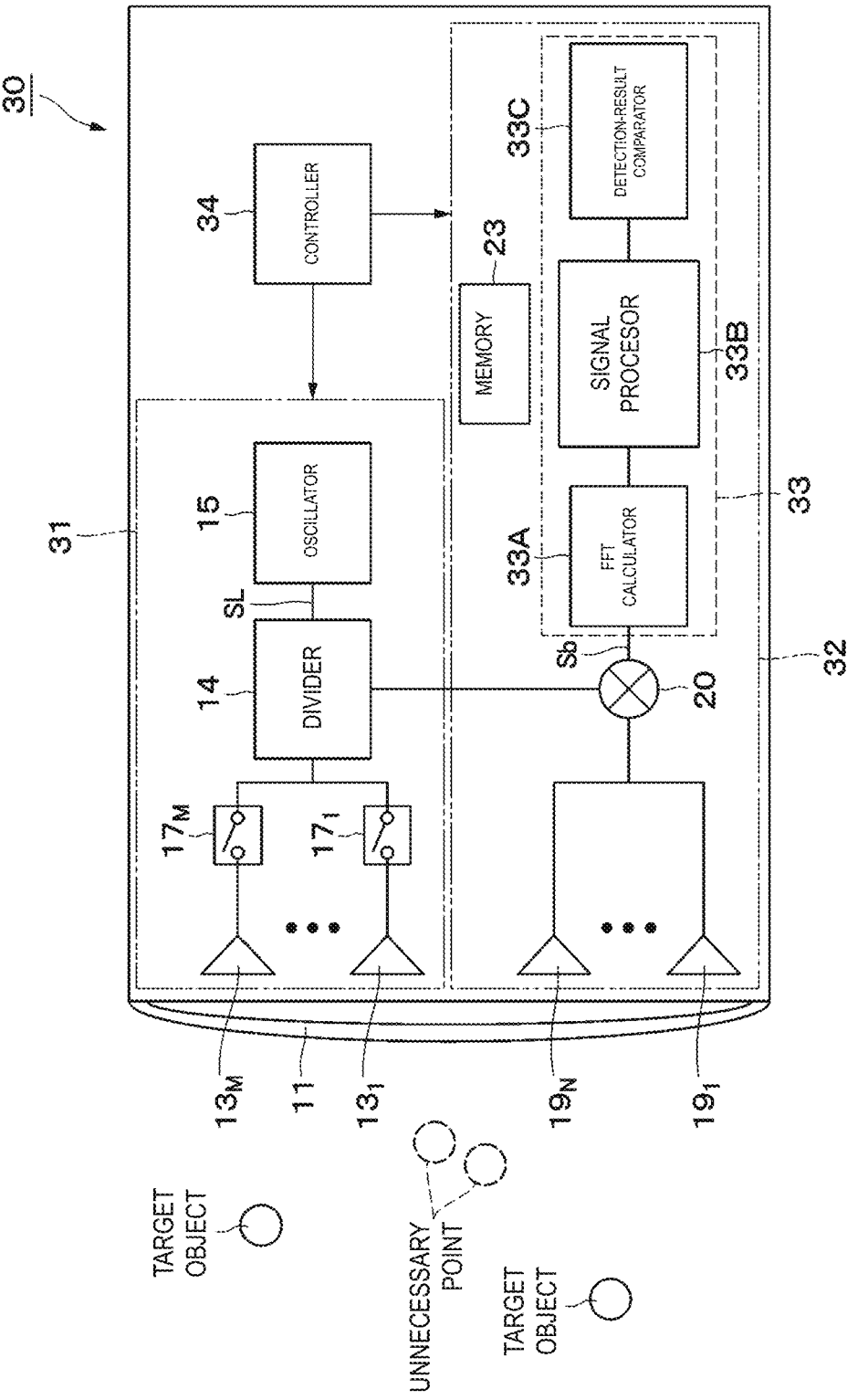
FIG. 8 is a block diagram illustrating a radar apparatus according to a second embodiment of the present disclosure.

Next, FIG. 8 illustrates a second embodiment of the present disclosure. The second embodiment is characterized in that the receiver is configured to perform digital beamforming in which directivity of radio waves is controlled in accordance with digital data of the radio waves received by the plurality of receive antennas. In the second embodiment, the same constituent elements as the first embodiment are denoted by the same reference characters, and descriptions thereof are omitted.

As illustrated in FIG. 8, a radar apparatus 30 according to the second embodiment of the present disclosure includes a transmitter 31 and a receiver 32.

In the same manner as the transmitter 12 according to the first embodiment, the transmitter 31 includes multiple elements (for example, M pieces, where M is a natural number) of the transmit antennas $13_1$ to $13_M$, the divider 14, and the oscillator 15. The switches $17_1$ to $17_M$ are coupled to the transmit antennas $13_1$ to $13_M$. However, the transmitter 31 does not include any phase shifter. The transmitter 31 differs from the transmitter 12 according to the first embodiment in this point.

In the same manner as the receiver 18 according to the first embodiment, the receiver 32 includes multiple elements (for example, N pieces, where N is a natural number) of the receive antennas $19_1$ to $19_N$, the mixer 20, and processing circuitry 33. However, the receiver 32 does not include any phase shifter. The receiver 32 differs from the receiver 18 according to the first embodiment in this point.

The processing circuitry 33 is implemented by, for example, a microcomputer. The memory 23 is coupled to the processing circuitry 33. The processing circuitry 33 is configured by software and/or hardware to perform functions of an FFT calculator 33A, signal processor 33B, and a detection-result comparator 33C. The FFT calculator 33A is configured in the same manner as the FFT calculator 22A according to the first embodiment. The detection-result comparator 33C is configured in the same manner as the detection-result comparator 22C according to the first embodiment. The FFT calculator 33A measures the distance to a target object and also outputs the power spectrum of the beat signal Sb.

The power spectrum of the beat signal Sb outputted by the FFT calculator 33A is inputted to the signal processor 33B. The signal processor 33B performs digital beamforming by using the power spectrum of the beat signal Sb. As such, the signal processor 33B controls the phase of digital data based on the receive antennas $19_1$ to $19_N$ and changes the beam pattern of the receive antennas $19_1$ to $19_N$. The signal processor 33B detects the azimuth angle of a target object in each beam pattern. In this manner, the processing circuitry 33 locates a plurality of target objects by obtaining the distance and azimuth angle of each target object in the manner described above. The processing circuitry 33 stores the position of the detected target object in the memory 23.

When a first beam pattern is used for detection, the receiver 32 stores as the first result a detection result indicating the position of a reflection point of radio wave. Specifically, for example, any one of the transmit antennas $13_1$ to $13_M$ emits a non-directional radio wave, and the receiver 32 detects the position of a reflection point of radio wave by using the first beam pattern. At this time, the receiver 32 stores a detection result indicating the position of the reflection point of radio wave as the first result in the memory 23. In the first beam pattern, for example, the receive antennas $19_1$ to $19_N$ in the non-directional mode receive radio waves.

When the second beam pattern is used for detection, the receiver 32 stores as the second result a detection result indicating the position of the reflection point of radio wave. Specifically, for example, any one of the transmit antennas $13_1$ to $13_M$ emits a non-directional radio wave, and the receiver 32 detects the position of a reflection point of radio wave by using the second beam pattern. At this time, the receiver 32 stores a detection result indicating the position of the reflection point of radio wave as the second result in the memory 23. In the second beam pattern, for example, the receive antennas $19_1$ to $19_N$ having a particular form of directivity receive radio waves.

The detection-result comparator 33C compares the first and second results. When the position of a reflection point of the first result is different from the position of the reflection point of the second result, the detection-result comparator 33C removes the reflection point that differs in position (unnecessary point).

A controller 34 is configured in the same manner as the controller 24 according to the first embodiment. The controller 34 controls the receiver 32 to store the first result based on the first beam pattern in the memory 23. The controller 24 controls the receiver 32 to store the second result based on the second beam pattern in the memory 23. After the first and second results are stored, the controller 34 compares the first and second results by using the detection-result comparator 33C and removes unnecessary points.

Also, in the second embodiment configured as described above, it is possible to accurately distinguish between a reflection point appearing due to reflection by a target physical object and an unnecessary point appearing due to reflection by the radome 11. Furthermore, because in the second embodiment the receiver performs digital beamforming, it is possible to easily create a plurality of beam patterns by controlling the phase of digital data obtained by the plurality of receive antennas $19_1$ to $19_N$ and combining these pieces of digital data. Thus, the radar apparatus 30 can easily obtain detection results of a plurality of beam patterns.

In the second embodiment, the receive side switches between the first and second beam patterns. Hence, only a single transmit antenna may be included.

The second embodiment uses the first beam pattern implemented by MIMO and the second beam pattern implemented by digital beamforming. The present disclosure is not limited to this configuration. The first and second beam patterns can be both implemented by digital beamforming. In this case, the first and second beam patterns are different from each other with respect to, for example, the direction of the main beam.

Figure 9:
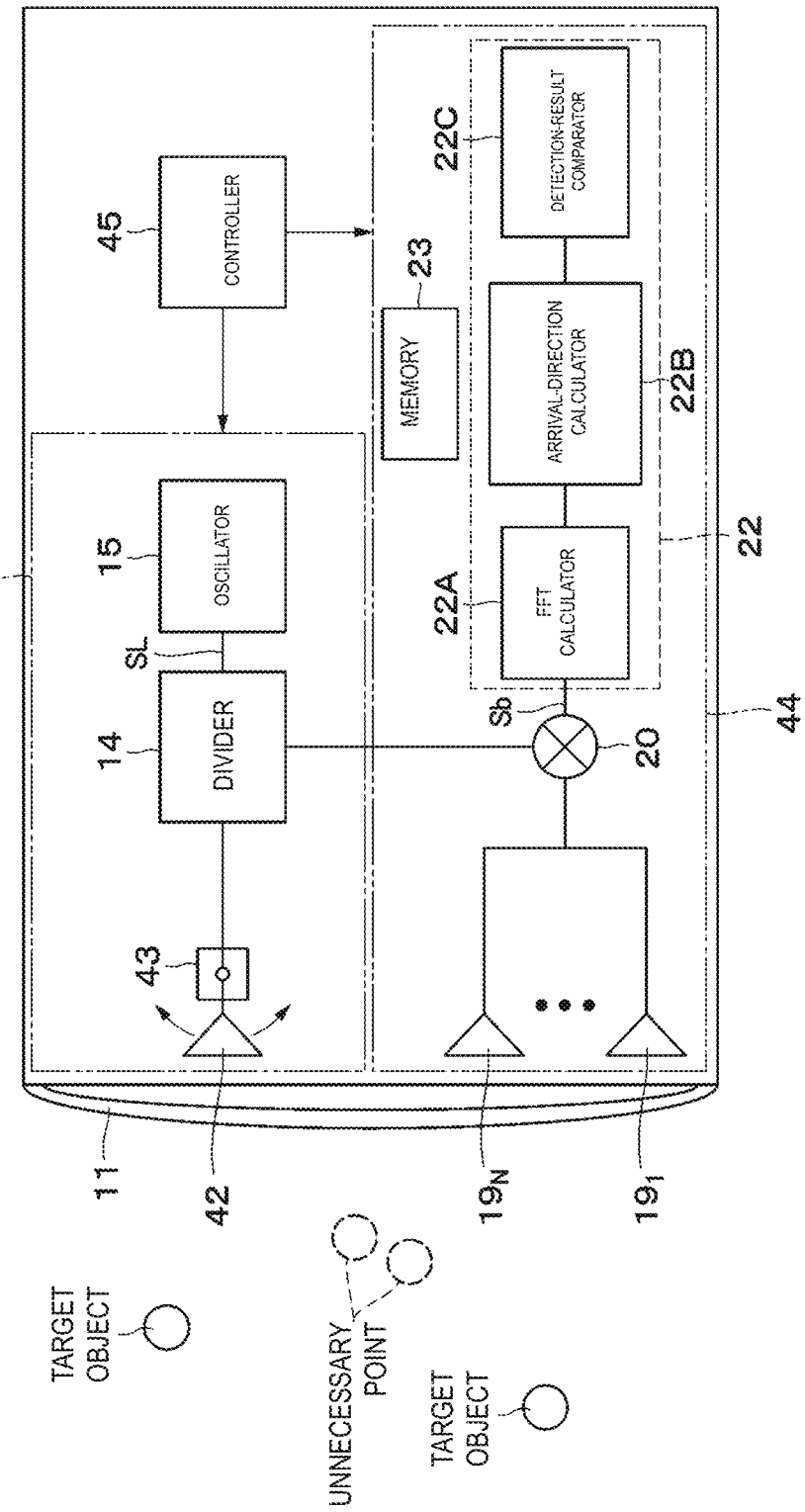
FIG. 9 is a block diagram illustrating a radar apparatus according to a third embodiment of the present disclosure.

Next, FIG. 9 illustrates a third embodiment of the present disclosure. The third embodiment is characterized in that the transmitter switches between the first and second beam patterns by mechanically changing the orientation of the transmit antenna. In the third embodiment, the same constituent elements as the first embodiment are denoted by the same reference characters, and descriptions thereof are omitted.

As illustrated in FIG. 9, a radar apparatus 40 according to the third embodiment of the present disclosure includes a transmitter 41 and a receiver 44.

The transmitter 41 includes a single transmit antenna 42, the divider 14, and the oscillator 15. The radome 11 covers the transmit antenna 42 and the receive antennas $19_1$ to $19_N$. The transmit antenna 42 has a particular form of directivity. The transmit antenna 42 is attached to a scanning mechanism 43. As a result, by operating the scanning mechanism 43, the transmit antenna 42 can change the direction in which a radio wave is emitted. As such, the transmitter 41 switches between the first and second beam patterns.

In the same manner as the receiver 18 according to the first embodiment, the receiver 44 includes multiple pieces (for example, N pieces, where N is a natural number) of the receive antennas $19_1$ to $19_N$, the mixer 20, and the processing circuitry 22. The memory 23 is coupled to the processing circuitry 22. However, the receiver 44 does not include any phase shifter. The receiver 44 differs from the receiver 18 according to the first embodiment in this point.

When a first beam pattern is used for detection, the receiver 44 stores as the first result a detection result indicating the position of a reflection point of radio wave. Specifically, when the transmitter 41 emits a radio wave of the first beam pattern, the receiver 44 stores a detection result indicating the position of a reflection point of radio wave as the first result in the memory 23. In the first beam pattern, for example, the main beam is directed in a front direction perpendicular to the travel direction of the vehicle.

When the second beam pattern is used for detection, the receiver 44 stores as the second result a detection result indicating the position of the reflection point of radio wave. Specifically, when the transmitter 41 emits a radio wave of the second beam pattern, the receiver 44 stores a detection result indicating the position of a reflection point of radio wave as the second result in the memory 23. In the second beam pattern, for example, the main beam is directed obliquely to the front direction. Specifically, when the first beam pattern is used for detection of a target physical object and a reflection point exists at a short distance, the main beam in the second beam pattern is directed toward the reflection point at the short distance.

The detection-result comparator 22C compares the first and second results. When the position of a reflection point of the first result is different from the position of the reflection point of the second result, the detection-result comparator 22C removes the reflection point that differs in position (unnecessary point).

The controller 45 controls the transmitter 41 to emit a radio wave of the first beam pattern. At this time, the controller 45 controls the receiver 44 to store in the memory 23 the first result obtained with the first beam pattern. The controller 45 also controls the transmitter 41 to emit a radio wave of the second beam pattern. At this time, the controller 45 controls the receiver 44 to store in the memory 23 the second result obtained with the second beam pattern. After the first and second results are stored, the controller 45 compares the first and second results by using the detection-result comparator 22C and removes unnecessary points.

Also, in the third embodiment configured as described above, it is possible to accurately distinguish between a reflection point appearing due to reflection by a target physical object and an unnecessary point appearing due to reflection by the radome 11. In the third embodiment, the transmitter 41 controls the directivity of the transmit antenna 42 by mechanically changing the orientation of the transmit antenna 42, so that the transmitter 41 can switch between the first and second beam patterns. Thus, the radar apparatus 40 can easily obtain detection results of a plurality of beam patterns.

Although in the embodiments described above the transmit signal St is created as a chirp signal in which the frequency linearly increases, the transmit signal St may be created as a chirp signal in which the frequency linearly decreases.

The embodiments described above use as an example the case in which the radar apparatuses 10, 30, and 40 search for a target object by using the FMCW technique. The present disclosure is not limited to this configuration. The radar apparatus may be, for example, a pulse radar that searches for a target object by using a pulse wave.

In the embodiments described above, detection results obtained by using two beam patterns for detection are compared to each other, and as a result, a reflection point that differs in position between the two beam patterns is determined as an unnecessary point and removed. The present disclosure is not limited to this configuration. Detection results obtained by using three or more beam patterns for detection may be compared to each other, and as a result, a reflection point that differs in position between the two beam patterns is determined as an unnecessary point and removed.

Although the embodiments are described by using as an example the radar apparatuses 10, 30, and 40 that estimate the position of a target object in a two-dimensional plane, the present disclosure may be applied to a radar apparatus that estimate the position of a target object in a three-dimensional space.

For example, the following aspects can be considered as the radar apparatus, the vehicle, and the method of removing an unnecessary point according to the embodiments described above.

According to a first aspect, a radar apparatus has a transmitter including a transmit antenna, a divider, and an oscillator, and a receiver including a receive antenna, a mixer, and processing circuitry. At least either the transmit antenna or the receive antenna is one of a plurality of transmit antennas or one of a plurality of receive antennas. The transmitter or the receiver is capable of using a first beam pattern and a second beam pattern different from the first beam pattern. The receiver includes a memory and a detection-result comparator. The memory is configured to, when the first beam pattern is used for detection, store as a first result a detection result indicating a position of a reflection point of radio wave and, when the second beam pattern is used for detection, store as a second result a detection result indicating a position of the reflection point of radio wave. The detection-result comparator is configured to compare the first result and the second result and, when the position of the reflection point of the first result is different from the position of the reflection point of the second result, remove the reflection point that differs in position. With this configuration, the radar apparatus can remove an unnecessary point appearing due to reflection by, for example, a radome and accurately detect a reflection point of a target.

According to a second aspect, in the first aspect, the transmitter or the receiver is configured to perform analog beamforming in which the directivity of radio wave is controlled by a phase shifter. With this configuration, it is possible to switch beam patterns, and thus, the position of a reflection point can be detected by using at least two beam patterns.

According to a third aspect, in the first aspect, the receiver is configured to perform digital beamforming in which the directivity of radio wave is controlled in accordance with digital data of radio waves received by the plurality of receive antennas. With this configuration, it is possible to switch beam patterns, and thus, the position of a reflection point can be detected by using at least two beam patterns.

According to a fourth aspect, in the first aspect, the transmitter is configured to switch between the first beam pattern and the second beam pattern by mechanically changing an orientation of the transmit antenna. With this configuration, it is possible to detect the position of a reflection point in the first beam pattern and the position of the reflection point in the second beam pattern.

According to a fifth aspect, a vehicle includes the radar apparatus of any of the first to fourth aspects. With this configuration, it is possible to detect a target physical object around the vehicle while removing unnecessary points.

According to a sixth aspect, a method of removing an unnecessary point is for use by a radar apparatus having a transmitter including a transmit antenna, a divider, and an oscillator and a receiver including a receive antenna, a mixer, and processing circuitry. At least either the transmit antenna or the receive antenna is one of a plurality of transmit antennas or one of a plurality of receive antennas. The transmitter or the receiver is capable of using a first beam pattern and a second beam pattern different from the first beam pattern. The method includes, by the receiver, when the first beam pattern is used for detection, storing as a first result a detection result indicating a position of a reflection point of radio wave, when the second beam pattern is used for detection, storing as a second result a detection result indicating a position of the reflection point of radio wave, and comparing the first result and the second result and, when the position of the reflection point of the first result is different from the position of the reflection point of the second result, removing the reflection point that differs in position. With this configuration, the radar apparatus can remove an unnecessary point appearing due to reflection by, for example, a radome and accurately detect a reflection point of a target.

The invention claimed is:

1. A radar apparatus comprising:
   a transmitter including a transmit antenna; and
   a receiver including a receive antenna and processing circuitry, wherein:
   at least one of the transmit antenna and the receive antenna is one of a plurality of transmit antennas or one of a plurality of receive antennas,
   the transmitter or the receiver is configured to use a first beam pattern and a second beam pattern different from the first beam pattern,
   the receiver includes a memory configured to:
      in a case that the first beam pattern is used for detection, store as a first result a detection result indicating a position of a reflection point of a radio wave, and
      in a case that the second beam pattern is used for detection, store as a second result a detection result indicating a position of the reflection point of the radio wave,
   the processing circuitry is configured to compare the first result and the second result and, in a case that the position of the reflection point of the first result is different from the position of the reflection point of the second result, remove the reflection point that differs in position,
   the first beam pattern is implemented by multiple-input multiple output (MIMO) and the second beam pattern is implemented by analog beamforming, and
   the transmitter includes:
      an oscillator configured to oscillate and output a local signal;
      a divider configured to divide the local signal output from the oscillator into a first divided signal and a second divided signal;
      a first switch connected between an output of the divider and a first antenna element of the plurality of transmit antennas and configured to receive the first divided signal;
      a second switch connected between the output of the divider and a second antenna element of the plurality of transmit antennas and configured to receive the second divided signal;
      a first phase shifter connected directly between an output of the first switch and the first antenna element and configured to phase shift the first divided signal output from the first switch; and
      a second phase shifter connected directly between an output of the second switch and the second antenna element and configured to phase shift the second divided signal output from the second switch.

2. The radar apparatus of claim 1, wherein the transmitter is configured to perform analog beamforming in which directivity of radio wave is controlled by a phase shifter.

3. The radar apparatus of claim 1, wherein the receiver is configured to perform digital beamforming in which directivity of radio wave is controlled in accordance with digital data of radio waves received by the plurality of receive antennas.

4. The radar apparatus of claim 1, wherein the transmitter is configured to switch between the first beam pattern and the second beam pattern by mechanically changing an orientation of the transmit antenna.

5. The radar apparatus of claim 1, wherein the local signal is a chirp signal in which a frequency of the signal linearly increases with time.

6. The radar apparatus of claim 1, wherein:
   a first of the plurality of transmit antennas is configured to output the first divided signal, and
   a second of the plurality of transmit antennas is configured to output the second divided signal.

7. The radar apparatus of claim 1, wherein:
   a first of the plurality of transmit antennas is configured to output the first divided signal output from the first switch, and
   a second of the plurality of transmit antennas is configured to output the second divided signal output from the second switch.

8. The radar apparatus of claim 1, wherein the receiver includes a mixer configured to receive the local signal output by the oscillator and a plurality of signals received from the plurality of receive antennas.

9. The radar apparatus of claim 8, wherein the mixer is configured to generate a differential signal based on the local signal and the plurality of signal received from the plurality of receive antennas.

10. The radar apparatus of claim 9, wherein the processing circuitry is configured to detect a position of the reflection point of the radio wave based on the differential signal output by the mixer.

11. The radar apparatus of claim 9, wherein the processing circuitry is configured to generate the first result and the second result based on the signal output by the mixer.

12. The radar apparatus of claim 11, wherein the processing circuitry is configured to remove the reflection point in a case that the distance of the reflection point is equal to or less than a predetermined distance.

13. The radar apparatus of claim 1, wherein in a case that the first beam pattern is used for detection, the processing circuitry is configured to determine a distance of the reflection point from the at least one of the transmit antenna and the receive antenna.

14. A vehicle comprising the radar apparatus according to claim 1.

15. An electronic device comprising:
   a transmitter including a first plurality of transmission antennas configured to transmit a first plurality of signals according to a first beam pattern and a second plurality of signals according to a second beam pattern;
   a receiver including a plurality of reception antennas configured to receive a first plurality of reflected waves based on the transmitted first plurality of signals and a second plurality of reflected waves based on the transmitted second plurality of signals;

memory configured to:
  store a first detection result corresponding to a first position of a first reflection point based on the first plurality of reflected waves received by the plurality of reception antennas, and
  store a second detection result corresponding to a second position of a second reflection point of a radio wave based on the second plurality of reflected waves received by the plurality of reception antennas; and
  processing circuitry configured to delete the first detection result from the memory in a case that the first position the first reflection point is different from the second position of the second reflection point,
wherein the first beam pattern is implemented by multiple-input multiple output (MIMO) and the second beam pattern is implemented by analog beamforming, and
the transmitter includes:
  an oscillator configured to oscillate and output a local signal;
  a divider configured to divide the local signal output from the oscillator into a first divided signal and a second divided signal;
  a first switch connected between an output of the divider and a first antenna element of the plurality of transmit antennas and configured to receive the first divided signal;
  a second switch connected between the output of the divider and a second antenna element of the plurality of transmit antennas and configured to receive the second divided signal;
  a first phase shifter connected directly between an output of the first switch and the first antenna element and configured to phase shift the first divided signal output from the first switch; and
  a second phase shifter connected directly between an output of the second switch and the second antenna element and configured to phase shift the second divided signal output from the second switch.

16. A method of removing an unnecessary point, the method being for use by a radar apparatus having a transmitter including a transmit antenna, and a receiver including a receive antenna and processing circuitry, wherein at least either the transmit antenna or the receive antenna is one of a plurality of transmit antennas or one of a plurality of receive antennas, and the transmitter or the receiver is capable of using a first beam pattern and a second beam pattern different from the first beam pattern, the method comprising:
  storing as a first result a detection result indicating a position of a reflection point of radio wave in a case that the first beam pattern is used for detection;
  storing as a second result a detection result indicating a position of the reflection point of a radio wave in a case that the second beam pattern is used for detection; and
  comparing the first result and the second result and, in a case that the position of the reflection point of the first result is different from the position of the reflection point of the second result, removing the reflection point that differs in position,
wherein the first beam pattern is implemented by multiple-input multiple output (MIMO) and the second beam pattern is implemented by analog beamforming, and
the transmitter includes:
  an oscillator configured to oscillate and output a local signal;
  a divider configured to divide the local signal output from the oscillator into a first divided signal and a second divided signal;
  a first switch connected between an output of the divider and a first antenna element of the plurality of transmit antennas and configured to receive the first divided signal;
  a second switch connected between the output of the divider and a second antenna element of the plurality of transmit antennas and configured to receive the second divided signal;
  a first phase shifter connected directly between an output of the first switch and the first antenna element and configured to phase shift the first divided signal output from the first switch; and
  a second phase shifter connected directly between an output of the second switch and the second antenna element and configured to phase shift the second divided signal output from the second switch.

* * * * *